United States Patent
Allen

(10) Patent No.: US 10,364,000 B1
(45) Date of Patent: Jul. 30, 2019

(54) LIGHTED STANCHION BASE FOR A MARINE VESSEL

(71) Applicant: Research & Design Innovations, LLC, Branford, CT (US)

(72) Inventor: Donald Terry Allen, Madison, CT (US)

(73) Assignee: Research & Design Innovations, LLC, Branford, CT (US)

( * ) Notice: Subject to any disclaimer, the term of this patent is extended or adjusted under 35 U.S.C. 154(b) by 35 days.

(21) Appl. No.: 15/705,843

(22) Filed: Sep. 15, 2017

Related U.S. Application Data

(63) Continuation of application No. 15/249,652, filed on Aug. 29, 2016.

(60) Provisional application No. 62/211,380, filed on Aug. 28, 2015, provisional application No. 62/219,414, filed on Sep. 16, 2015.

(51) Int. Cl.
| | |
|---|---|
| *B63B 45/06* | (2006.01) |
| *B63B 17/04* | (2006.01) |
| *B63B 45/04* | (2006.01) |
| *B63B 29/04* | (2006.01) |
| *F21W 107/20* | (2018.01) |

(52) U.S. Cl.
CPC .............. *B63B 45/04* (2013.01); *B63B 17/04* (2013.01); *B63B 29/04* (2013.01); *B63B 2029/043* (2013.01); *F21W 2107/20* (2018.01)

(58) Field of Classification Search
CPC .......... B63B 45/04; B63B 17/04; B63B 29/04
See application file for complete search history.

(56) References Cited

U.S. PATENT DOCUMENTS

| | | | |
|---|---|---|---|
| 9,885,470 B1 | 2/2018 | Jean | |
| 2003/0081401 A1 | 5/2003 | Camarota | |
| 2006/0144315 A1* | 7/2006 | Garelick | B63B 29/04 |
| | | | 114/364 |
| 2015/0043209 A1* | 2/2015 | Nirenberg | A01K 97/10 |
| | | | 362/249.06 |
| 2016/0332548 A1* | 11/2016 | Deurr | B60N 2/809 |

\* cited by examiner

*Primary Examiner* — Anh T Mai
*Assistant Examiner* — Nathaniel J Lee
(74) *Attorney, Agent, or Firm* — DeLio, Peterson & Crucio, LLC; Thomas E. Ciesco

(57) ABSTRACT

A method for providing lighting to a boat surface comprising providing an LED light source in a transparent disk and placing the disk on the boat surface in a location where the seat pedestal is to be mounted with the disk fastener openings aligned with the boat surface openings. The method includes connecting a power source to the light source, placing the seat pedestal on the transparent disk with the seat pedestal fastener openings aligned with the disk fastener openings and inserting the at least one fastener through the seat pedestal openings, disk openings and boat surface openings. The fastener secures the seat pedestal and disk to the boat surface wherein the transparent disk bears the weight of the seat pedestal. Upon providing power to the light source, light travels from the light source to the circumferential edge of the transparent disk, illuminating the area adjacent the seat pedestal.

16 Claims, 5 Drawing Sheets

LIGHTED STANCHION BASE FOR A MARINE VESSEL

This application claims priority to U.S. patent application Ser. No. 15/249,652 filed on Aug. 29, 2016 which claims priority to provisional patent application Ser. No. 62/211,380 filed on Aug. 28, 2015 and U.S. provisional patent application Ser. No. 62/219,414 filed on Sep. 16, 2015.

BACKGROUND OF THE INVENTION

1. Field of the Invention

The present invention relates generally to illuminated boating accessories and more specifically to illuminating seat pedestals and stanchions.

2. Description of Related Art

Companies manufacture boating accessories such seat pedestals, stanchions, hand rails and rod holders. The pedestals or other accessories have circular, oval or other shaped bases that may be bolted to an additional base or directly to the floor of the boat. The seat pedestals, hand rails, rod holders and stanchions may be mounted on the boat as delivered to the customer or may be provided as optional add-ons or aftermarket items.

SUMMARY OF THE INVENTION

Bearing in mind the problems and deficiencies of the prior art, it is therefore an object of the present invention to provide a method for lighting a boat surface.

It is another object of the present invention to provide a seat pedestal having an illuminated portion for aesthetic and lighting purposes.

A further object of the invention is to provide a stanchion having an illuminated portion for allowing a passenger or crew member to easily identify the stanchion in low lighting conditions.

It is yet another object of the present invention to provide an illuminated stanchion for allowing boaters to see a walkway in low light conditions.

Still other objects and advantages of the invention will in part be obvious and will in part be apparent from the specification.

The above and other objects, which will be apparent to those skilled in the art, are achieved in the present invention which is directed to a method for providing lighting to a boat surface comprising providing a boat accessory fastenable to the boat surface, the boat accessory having a base with a periphery and least one base fastener opening, the base fastener openings corresponding with at least one boat surface opening and at least one fastener disposable through the at least one base fastener opening and the at least one boat surface opening. The method includes providing a transparent disk having a thickness, an outer circumferential edge corresponding to the base periphery and at least one transparent disk opening corresponding to the boat surface openings sufficient to allow a portion of the fastener to pass therethrough, the transparent disk sufficient to bear the weight of the boat accessory. The method includes providing an LED light source in the transparent disk and placing the disk on the boat surface in a location where the boat accessory is to be mounted with the disk fastener openings aligned with the boat surface openings. The method includes connecting a power source to the LED light source, placing the boat accessory on the transparent disk with the boat accessory fastener openings aligned with the disk fastener openings and inserting the at least one fastener through the boat accessory openings, disk openings and boat surface openings. The method includes tightening the at least one fastener to secure the boat accessory and disk to the boat surface wherein the transparent disk bears the weight of the boating accessory. Upon providing power to the light source, light travels from the light source to the circumferential edge of the transparent disk, illuminating the area adjacent the boating accessory. The number of fasteners may correspond with the number of base openings, the number of transparent disk openings and the number of deck surface openings. The transparent disk may include a groove extending from a top surface or a bottom surface of the disk a distance less than the thickness of the disk and the light source may be disposed in the groove. The light source may be a plurality of discrete LED lamps which are spaced apart. The light source may be encapsulated to prevent water or moisture from contacting the light source. The outer circumferential edge may extend beyond the boat accessory base and may be chamfered so a portion of the light traveling from the light source to the circumferential edge may be directed in the direction perpendicular to the chamfer. The boat accessory may be a stanchion, a seat pedestal or a rod holder having a flange and a cylindrical body, the transparent disk being an annular transparent disk to allow the cylindrical body to extend through the transparent disk. The boat accessory may be a hand rail having opposing ends and the base may be a pair of feet, each foot at one end of the hand rail, the at least one fastener being a threaded post integral with and extending from each end of the hand rail. The steps beginning with the step of providing an LED light source in the transparent disk may include providing an LED light source in each of the transparent disks, placing the disks on the boat surface in locations where the hand rail is to be mounted with the disk fastener openings aligned with the threaded post and connecting a power source to the LED light sources. The method may include placing the hand rail on the transparent disk with the threaded posts aligned with the disk fastener openings, inserting the threaded posts through disk openings and boat surface openings and tightening the threaded posts to the boat surface to secure the hand rail and disk to the boat surface wherein the transparent disks bear the weight of the hand rail. Upon providing power to the light sources, light travels from the light sources to the circumferential edge of the transparent disks, illuminating the area adjacent the hand rail.

In another embodiment, the present invention may be directed to a lighted accessory for a boat comprising a base having a bottom surface, a periphery and at least one base fastener opening corresponding with a boat fastener opening on the boat. The lighted accessory includes a column extending from the base, a transparent disk having a thickness, an outer periphery edge corresponding to the base periphery and a disk fastener opening corresponding to the boat fastener opening. The transparent disk is disposed adjacent the bottom surface of the base and is sufficient to bear the weight of the boat accessory. At least one fastener extends through the base fastener opening, disk fastener opening and boat fastener opening. The lighting accessory includes a light source adjacent the transparent disk, wherein the light source provides illumination of the periphery edge of the transparent disk, illuminating the area adjacent the boating accessory. The number of fasteners may correspond with the number of base openings, the number of transparent disk openings and the number of deck surface openings. The transparent disk may include a groove extending from a top surface of the disk a distance less than the thickness of the disk and the light source is disposed in the groove. The light source may be a plurality of discrete LED lamps which are spaced apart. The light source may be encapsulated to prevent water or moisture from contacting the light source. The outer circumferential edge may extend beyond the boat accessory base and may be chamfered so a portion of the light traveling from the light source to the circumferential edge may be directed in the direction perpendicular to the chamfer. The lighted accessory may be a stanchion, a seat pedestal or a rod holder having a flange and a cylindrical body, the transparent disk being an annular transparent disk to allow the cylindrical body to extend through the transparent disk. The lighted accessory may be a hand rail having opposing ends and the base may be a pair of feet, each foot at one end of the hand rail, the at least one fastener being a threaded post integral with and extending from each end of the hand rail.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment of the present invention, reference will be made herein to FIGS. 1-19 of the drawings in which like numerals refer to like features of the invention.

Figure 1:
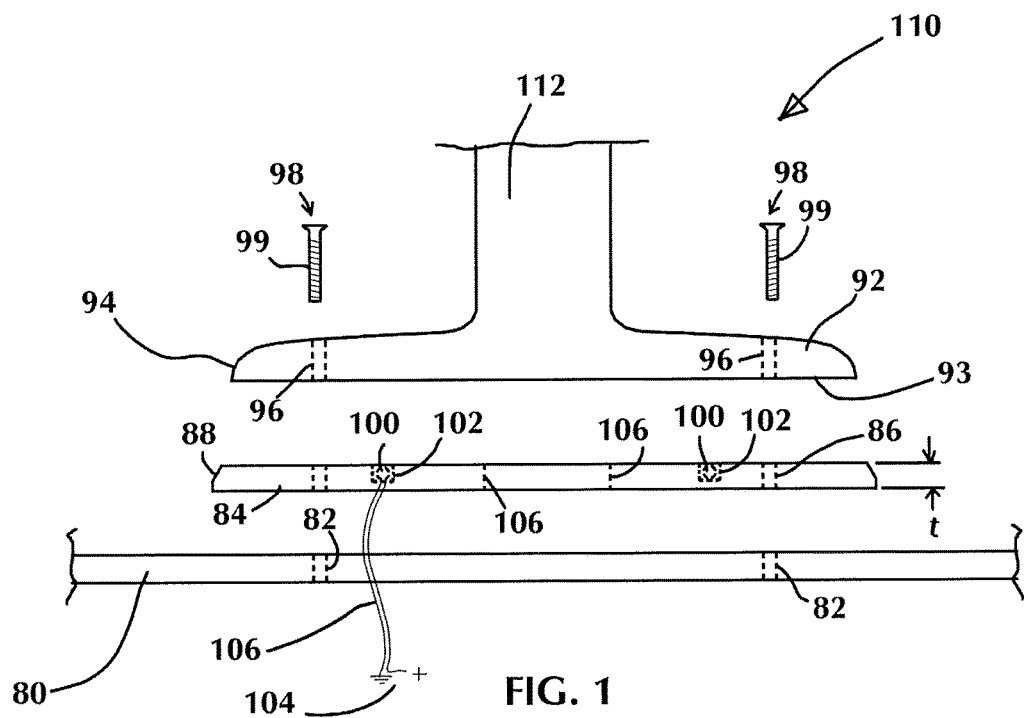
FIG. 1 is an exploded side elevational view of the seat pedestal or stanchion base for providing lighting to a boat surface according to the present invention.
Figure 2:
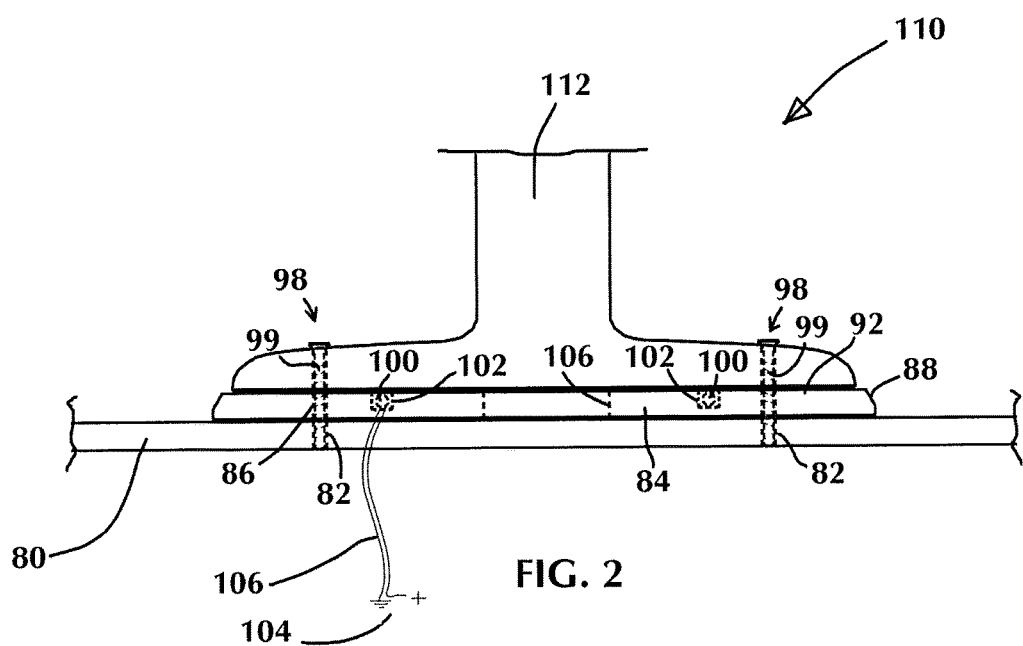
FIG. 2 is a side elevational view of the seat pedestal or stanchion base for providing lighting to a boat surface according to the present invention.
Figure 3:
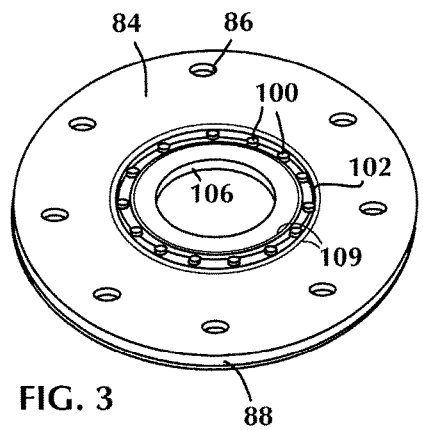
FIG. 3 is a perspective view of the transparent disk according to the present invention.
Figure 4:
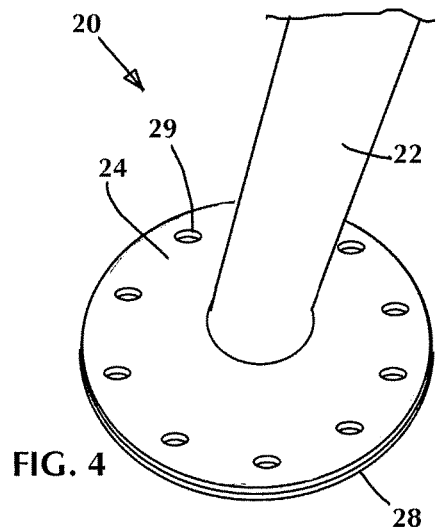
FIG. 4 is a perspective view of the lighted seat pedestal or stanchion base according to the present invention.
Figure 5:
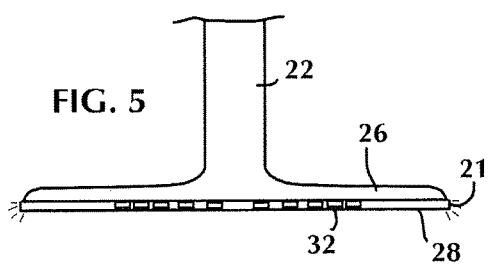
FIG. 5 is a side elevational view of the lighted seat pedestal or stanchion base shown in FIG. 4.

In a first embodiment of a lighted boat accessory as shown in the exploded side view of FIG. 1, the assembled side view of FIG. 2 and the transparent disk in FIG. 3, the lighted accessory 110 for a boat includes a base 92 having a bottom surface 93, a periphery 94 and base fastener openings 96 which correspond with boat fastener openings 82 on the boat surface 80. As used herein, the term boat surface may include any surface in or on a boat or other watercraft, such as an inside or outside deck, floor, wall, ceiling, cabin top or side, gunwale or hull. As used herein, the term boat accessory may include any object or device that may be structurally mounted via a base on a boat surface, such as a seat, table, hand rail or hand grab, communication or navigation device, device holder, rod, stanchion, pole or pedestal.

The lighted accessory 110 shown in FIGS. 1-3 includes a column 112 extending from the base 92 and a transparent disk 84 having a thickness t, an outer periphery edge 88 corresponding to the base periphery 94 and disk fastener openings 86 corresponding to the boat fastener openings 82, the transparent disk 84 disposed adjacent the bottom surface of the base 92. The base 92 may be circular, oval, rectangular or any other shape. The transparent disk 84 is sufficient to bear the load and weight of the boat accessory 110. The lighted accessory 110 includes fasteners 98 extending through the base fastener opening 96, disk fastener opening 86 and boat fastener opening 82. A light source 100 is disposed adjacent the transparent disk 84. The light source 100 provides illumination of the periphery edge 88, illuminating the area adjacent the boating accessory 110. The accessory of claim 12 wherein the transparent disk includes a groove extending from a top surface of the disk a distance less than the thickness of the disk and the light source is disposed in the groove. The light source 100 includes a plurality of discrete LED lamps which are spaced apart. As shown on the transparent disk 84 in FIG. 3, the light source 100 may be encapsulated by attaching a clear membrane or transparent cover 109 along the top portion of the groove 102 to prevent water for contacting the light source. Encapsulating the light source 100 prevents water and moisture from affecting the light source given the nature of the potential uses of the lighted accessories on a boat. The light source 100 may alternately include an encapsulated sleeve so that no membrane may be needed to make the light source 100 waterproof. The outer circumferential edge 88 may extend beyond the boat accessory base and may be chamfered or beveled so that a portion of the light traveling from the light source to the circumferential edge is directed in the direction perpendicular to the chamfer. The LED lighting may provide different color illumination by combining red, green and blue LED sources in any arrangement. Specific color LEDs may also be used. The light source may alternately be incandescent or other type of illumination.

Figure 6:
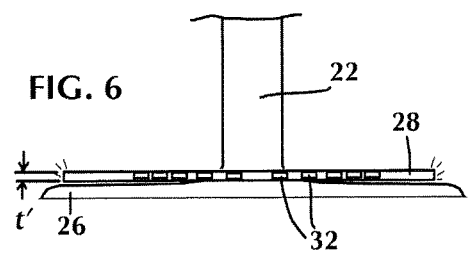
FIG. 6 is a side elevational view of a second embodiment of the lighted seat pedestal or stanchion base according to the present invention.
Figure 7:
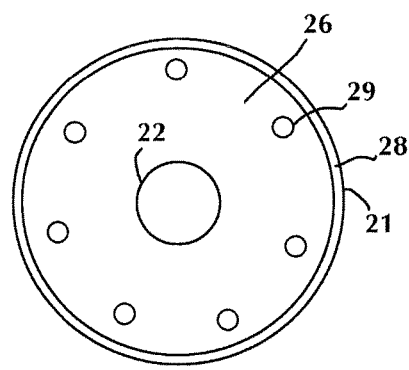
FIG. 7 is a top elevational view of the lighted seat pedestal or stanchion base shown in FIG. 4.
Figure 8:
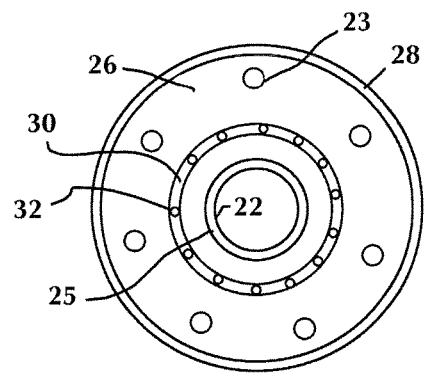
FIG. 8 is a bottom elevational view of the lighted seat pedestal or stanchion base shown in FIG. 4.
Figure 9:
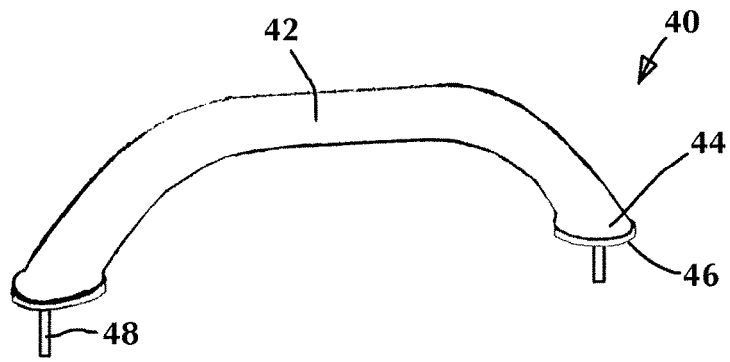
FIG. 9 is a perspective view of the lighted handrail according to the present invention.
Figure 10:
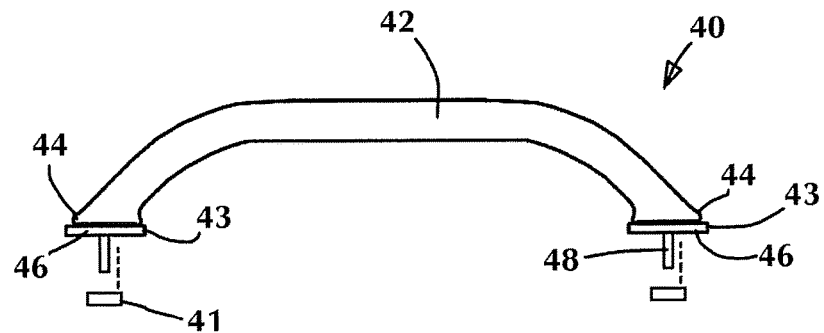
FIG. 10 is a side elevational view of the lighted handrail shown in FIG. 9.
Figure 11:
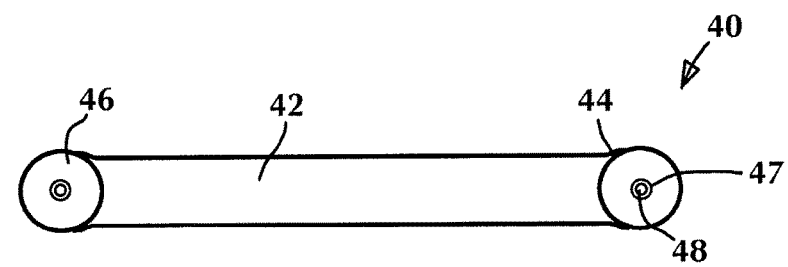
FIG. 11 is a bottom elevational view of the lighted handrail shown in FIG. 9.
Figure 12:
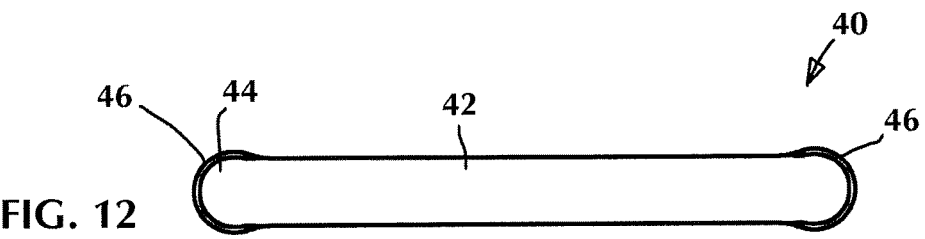
FIG. 12 is a top elevational view of the lighted handrail shown in FIG. 9.
Figure 13:
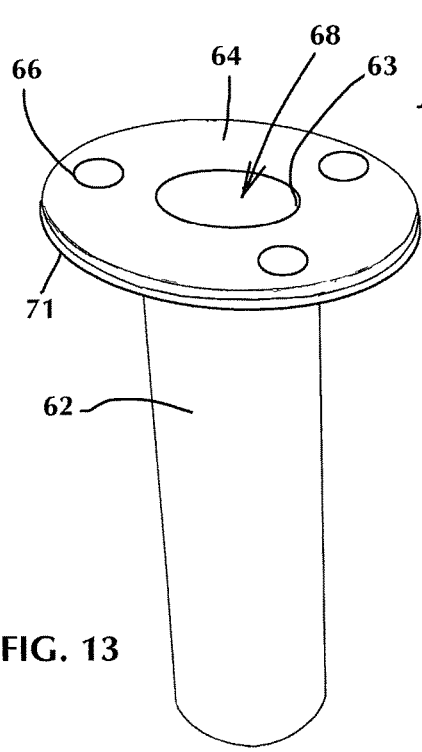
FIG. 13 is a perspective view of the lighted rod holder according to the present invention.
Figure 14:
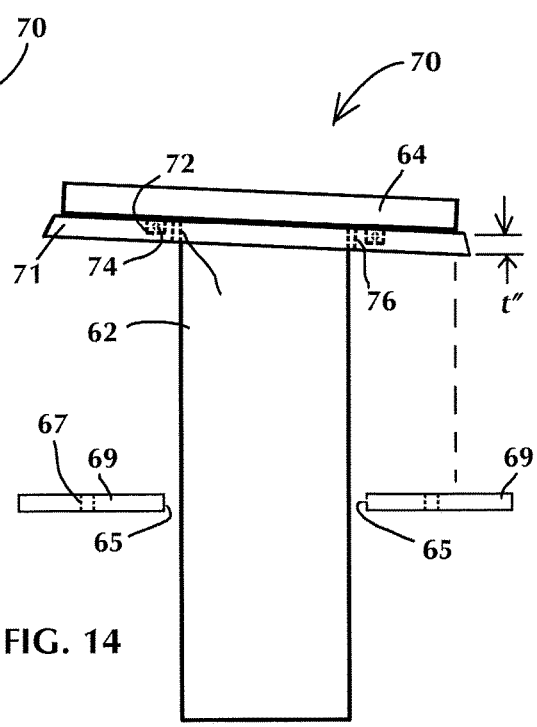
FIG. 14 is a side elevational view of the lighted rod holder shown in FIG. 13.
Figure 15:
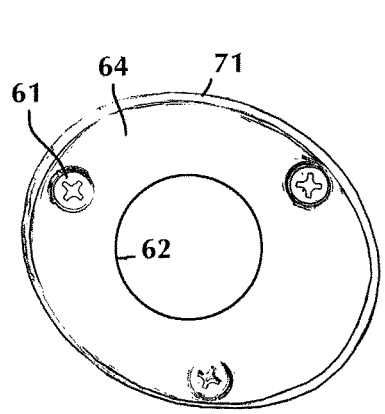
FIG. 15 is a top elevational view of the lighted rod holder shown in FIG. 13.
Figure 16:
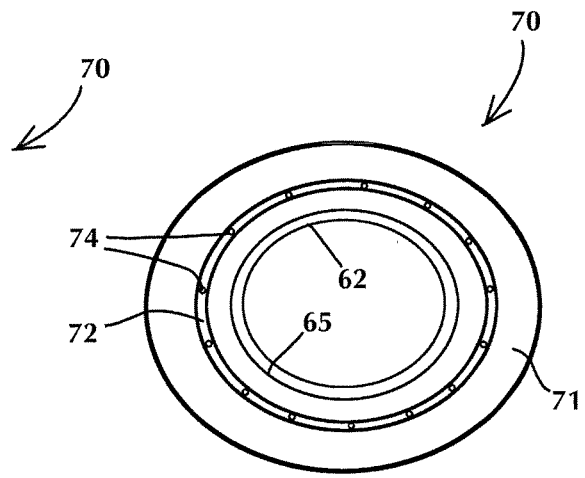
FIG. 16 is a bottom elevational view of the lighted rod holder shown in FIG. 13.

A lighted seat pedestal or stanchion 20 as shown in FIGS. 4-8 provides boaters with interior lighting. This embodiment of the lighted stanchion 20 may also be used as a seat pedestal. The lighted stanchion 20 provides elegant mood lighting and helps boaters navigate through the interior of the boat more safely. The lighted stanchion 20 includes a vertical column 22 extending upwardly from a stanchion base 26. The stanchion base 26 is shown as circular, but may be oval, rectangular or any other shape. A transparent disk 28 is disposed adjacent the bottom surface of the base 26, and has a configuration that is comparable to the base. The transparent disk 28 has a disk thickness t' and a disk inner circumference 25 and a disk periphery 21. The transparent disk thickness t' provides a medium for allowing light to pass from the light source 32 to the outer periphery 21 of the transparent disk 28. The transparent disk 28 includes disk openings 23 which align with base openings 29 so that fasteners may extend through both the stanchion base 26 and the transparent disk 28 to secure them to the boat deck or boat floor. The light source 32 may be disposed in the center of the transparent disk 28 but is preferably disposed in a circular groove 30 extending from a bottom surface of the transparent disk 28 a distance less than the thickness of the transparent disk 28 or the circular groove extending from a top surface of the transparent disk 28 a distance less than the thickness of the transparent disk 28. The light source provides light which travels from the groove 30 to the periphery 21 of the transparent disk 28, lighting up the periphery 21 of the transparent disk 28. Light from the light source may also scatter such that light also emanates from the top and bottom surface of the transparent disk 28, providing light along the top surface portion of the top surface visually exposed adjacent the outer circumference of the base 26. The light source 32 may be a plurality of spaced apart lamps. The light source is preferably a light emitting diode (LED). There may additionally be openings in the stanchion base 26 to allow light to emit from the stanchion base 26 openings. The periphery 21 of the transparent disk 28 may be vertical or may include an angled portion to allow the light to be directed in an outward and/or upward direction. The light source 32 may be enclosed in a sheath to make it waterproof. The lighted stanchion may provide light in any color and style. The light source 32 may be of any color. The transparent disk 28 is transparent and may have a color tint. The light guide 28 shown in FIG. 6 is disposed above the stanchion base 26 and may have a greater surface area to deliver the visible light.

The boat accessory may be a hand rail or hand grab as the one shown in FIGS. 9-12. The hand rail has a central bar 42 and opposing ends or feet 44. Each foot 44 may have a diameter slightly larger than the diameter of the central bar 42 and are disposed at opposite ends of the central bar 42. Each foot 44 includes a threaded post 48 integral with and extending from each foot 44 of the hand rail. The central bar 42 may be curved or may have curved features to allow the feet 44 to have bottom surface substantially parallel with one another. Lighted handle rings 46 are disposed adjacent the feet 44 and may be shaped to fit any existing boat handle. The lighted handle rings 46 include an opening 47 to allow the threaded post to pass through and a circumferential or periphery edge 43. The periphery edge 43 may include a chamfer or bevel to direct a portion of the light in an angled direction as shown on the lighted disk 71 in FIG. 14. The threaded posts 48 may include removable threaded nuts 41. Alternately, a handle may be provided which is made of a transparent material so the handle may be the light guide.

As shown in FIGS. 13-16 a lighted rod holder accessory 70 includes a cylindrical column 62 which may be disposed in a deck opening 65 of a boat surface 69. The deck opening 65 may be on a gunwale or deck portion so a fishing pole may be advantageously inserted into the rod holder 70. A rod holder base or flange 64 extends from an upper portion of the column 63 to allow the column 62 to be mounted a specific distance within the deck opening 65. A light guide or transparent disk 71 has a light guide thickness t" and is disposed on the underside of the rod holder flange 64 and includes a column opening 68 for the column 62 to extend through. A light source 74 is disposed in the transparent disk 71 so light from the light source 74 may travel from the light source 74 to the periphery edge 78 of the transparent disk 1. The transparent disk 70 may be beveled to direct light from the light source 74 at an angle from the transparent disk 70 surface. The light source may be disposed in a groove 72 in the surface of the transparent disk 71. The disc may be substantially circular, oval or any other shape. The rod holder 70 includes a flange and a cylindrical body and the transparent disk is an annular transparent disk to allow the cylindrical body to extend through the transparent disk 71.

In another embodiment of the lighted rod holder, the rod holder may be made of a transparent material so the rod holder may be a light guide. The light source may be provided in any location on an exterior surface of the rod holder. Alternately, the light source may be disposed within a groove in the rod holder column or in the rod holder base.

The light guide in any of the accessories above may be fully transparent as to allow light to readily travel through and may be constructed of materials such as Lexan, Plexiglas or any material which provides the ability to allow visible light to flow through. The light guide may have a color tint so the emanating light is of specific frequencies. The light source may additionally or alternately provide the light color. The light source may be one or more LED's or may be any source which provides visible light. The LED lighting may provide different color illumination by combining red, green and blue LED sources in any arrangement. Specific color LEDs may also be used. The light source may alternately be incandescent or other type of illumination.

Figure 17:
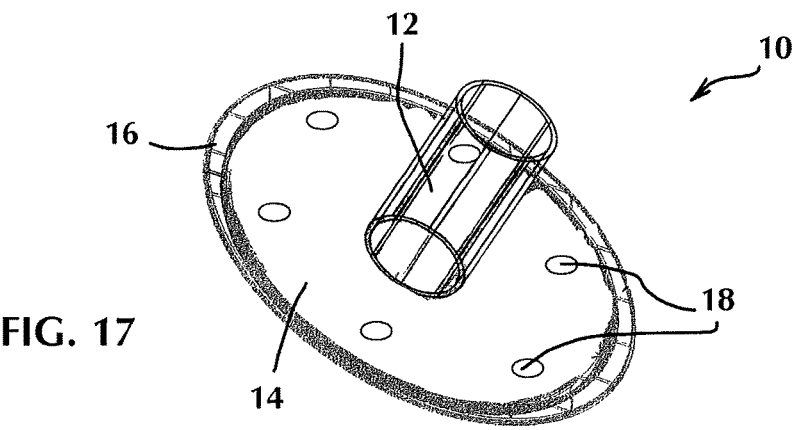
FIG. 17 is a perspective view of a lighted seat pedestal or stanchion base according to the present invention.
Figure 18:
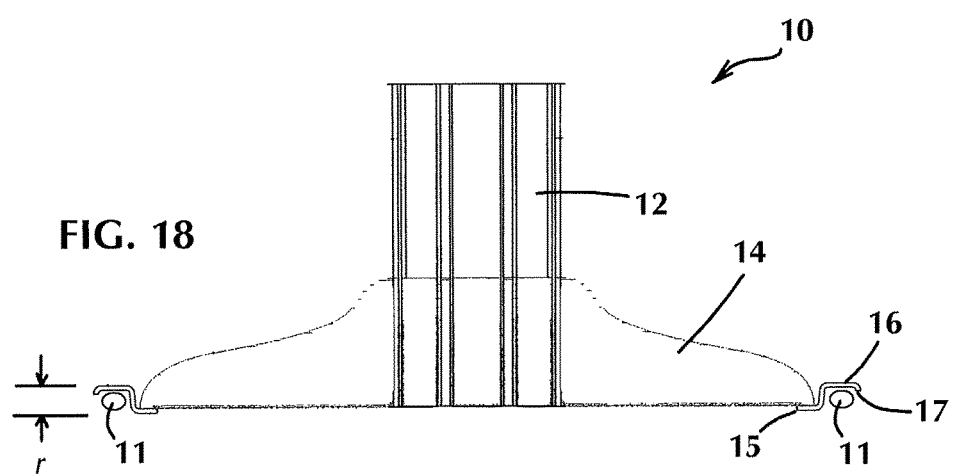
FIG. 18 is a side elevational view of the lighted seat pedestal or stanchion base shown in FIG. 17.

A method for providing lighting to a boat surface is shown in FIGS. 17 and 18. A boat accessory 90 which is fastenable to the boat surface 80 has a base 92 with a periphery 94 and a plurality of fastener openings 96. The base fastener openings 96 correspond with a plurality boat surface opening 82 and fasteners 98 disposable through base fastener openings 96 and boat surface openings 82. A transparent disk 84 is provided which has a thickness t and an outer circumferential edge 88 which corresponds to the boat accessory base periphery 94. A plurality of transparent disk openings 86 corresponds to the boat surface openings 82. The disk openings 86 are of sufficient diameter to allow a threaded portion 99 of the fastener 98 to pass through. The transparent disk 84 is made of a material which is both transparent and is structurally sound to bear the weight of the boat accessory 90. Materials such as polycarbonate or Lexan may provide these requirements. An LED light source 100 is disposed in the transparent disk 84. The disk 84 is positioned on the boat surface 80 in a location where the boat accessory 92 is to be mounted, the disk fastener openings 86 aligned with the boat surface openings 82. A power source 104 is connected to the LED light source 100 and the boat accessory 92 is placed on the transparent disk 84 with the boat accessory fastener openings 96 aligned with the disk fastener openings 86. The fasteners 98 or then inserted through the boat accessory openings 96, disk openings 86 and boat surface openings 82. The fasteners 98 are then tightened to secure the boat accessory 92 and disk 84 to the boat surface 80. The transparent disk 84 bears the weight of the boating accessory 92. Upon providing power 104 to the light source 100, light travels from the light source 100 to the circumferential edge 88 of the transparent disk 92, illuminating the area adjacent the boating accessory.

The assembly of the components of the invention described herein may be in any desired sequence. For example, the transparent disk 84 may be placed on the boat accessory base 92 before both are placed on the boat surface 80. Additionally, the fasteners 98 may be placed in the boat accessory openings 96 and disk openings 86 before the boating accessory 92 and transparent disk 84 are placed on the boat surface 80 or after they are placed on the boat surface 80.

The boat accessory may be a hand rail 40 or hand grab as the one shown in FIGS. 9-12. The hand rail has a central bar 42 and opposing ends or feet 44. Each foot 44 may have a diameter slightly larger than the diameter of the central bar 42 and are disposed at opposite ends of the central bar 42. Each foot 44 includes a threaded post 48 integral with and extending from each foot 44 of the hand rail. Lighted handle rings 46 are disposed adjacent the feet 44 and may be shaped to fit any existing boat handle. The lighted handle rings 46 include a fastener opening 47 to allow the threaded post to pass through. The lighted handle rings 46 include an LED light source in each. For the hand rail 40, the method includes placing the transparent disks or lighted handle rings 46 disks on the boat surface in locations where the hand rail 40 is to be mounted with the lighted handle ring fastener openings 47 aligned with the hand rail threaded posts 47. A power source 104 is connected to the LED light sources 100 and the threaded rods 48 are placed through the disk fastener openings 47 and the boat surface openings 82. The threaded posts 48 are tightened to the boat surface 80 with securing nuts 41 to secure the hand rail 40 and lighted handle rings 46 to the boat surface 80. The lighted handle rings 46 bear the weight and load of the hand rail 40. Upon providing power 104 to the light sources 100, light travels from the light sources 100 to the circumferential edge 43 of the lighted handle rings 46, illuminating the area adjacent the hand rail 40.

Figure 19:
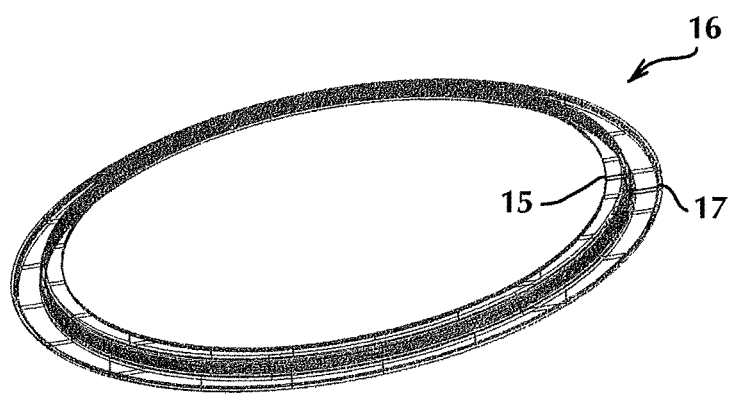
FIG. 19 is a perspective view of the light guide ring shown in FIG. 17.

In another embodiment as shown in FIGS. 17-19, a seat pedestal 10 includes a vertical column 12 extending upwardly from a pedestal base 14. The pedestal base 14 is shown as circular, but may be oval, rectangular or any other shape. A transparent or semi-transparent annular ring 16 may be attached to the bottom surface of the base 14. The ring 16 has a ring inner circumference 15 and a ring outer circumference 16. A ring thickness r provides a space for holding a light source 11 and allowing the light from the light source 11 to pass to the surface to which the ring is adjacent and the outer circumference 17 of the ring 16. Fastener openings 18 on the pedestal base 14 may be used to secure the pedestal base 17 and the transparent ring 16 to the floor or surface of the boat. The light source may be disposed in a circular groove 8 in the bottom surface of the ring 16. The light source 11 provides light which travels throughout the ring 16. Light from the light source may scatter such that light emanates from the top and bottom surface of the ring, providing light along the top surface portion of the top surface visually exposed adjacent the outer circumference of the base. The light source may be a singular lamp but may be a plurality of spaced apart LED lamps. There may additionally be openings in the pedestal base to allow light to be emitted from the pedestal openings. The illumination of the seat pedestal 14 is provided by the ring 16 with the interior LED lights in a sheath to make sure it is waterproof and gives off an even soft light around the perimeter of the pedestal base 14. A partial foot adjacent inner circumference 15 extends under the pedestal base 14 and is a thin material which can be lighted from the underside of the base and allows the light to radiate out to the external part of the light ring 16. In both embodiments, the outside of the base will be illuminated. This product may be applied to any pedestal and base system or just to a pedestal with separate base. The ring 16 and pedestal base 14 may be a clear polycarbonate material or other clear material which may readily transmit light internally to illuminate the surface of the ring 16 and pedestal base 14 and more specifically, illuminate at least a portion of the ring 16 or pedestal base surface which may etched for scattering of light at the surface, the etched surface being visually illuminated when a light source is supplied.

Various boat accessories may be mounted using the structurally-supporting, lighted disk below the accessory base of the present invention. The present invention has been shown to provide a seat pedestal having an illuminated portion for aesthetic and lighting purposes and a fishing pole holder having an illuminated portion. The present invention also provides a boat handrail having an illuminated portion for allowing a passenger or crew member to easily identify the handrail in low lighting conditions and light rings attachable to boat handrails. The present invention has been shown to provide a method for lighting a boat surface. The present invention also provides a seat pedestal having an illuminated portion for aesthetic and lighting purposes and a boat handrail having an illuminated portion for allowing a passenger or crew member to easily identify the handrail in low lighting conditions. The present invention also provides an illuminated stanchion for allowing boaters to see a walkway in low light conditions.

While the present invention has been particularly described, in conjunction with a specific embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
1. A method for providing lighting to a boat surface comprising:
    providing a stanchion base fastenable to the boat surface, the stanchion base having a base with a periphery and at least one base fastener opening, the base fastener openings corresponding with at least one boat surface opening and at least one fastener disposable through the at least one base fastener opening and the at least one boat surface opening;
    providing a transparent disk having a thickness, an outer circumferential edge corresponding to the base periphery and at least one transparent disk opening corresponding to the boat surface openings sufficient to allow a portion of the fastener to pass therethrough, the transparent disk sufficient to bear the weight of the stanchion base;
    providing an LED light source in the transparent disk;
    placing the disk on the boat surface in a location where the stanchion base is to be mounted with the disk fastener openings aligned with the boat surface openings;
    connecting a power source to the LED light source;
    placing the stanchion base on the transparent disk with the stanchion base fastener openings aligned with the disk fastener openings;

inserting the at least one fastener through the stanchion base openings, disk openings and boat surface openings;

tightening the at least one fastener to secure the stanchion base and disk to the boat surface wherein the transparent disk bears the weight of the stanchion base; and upon providing power to the light source, light travels from the light source to the circumferential edge of the transparent disk, illuminating the area adjacent the stanchion base.

2. The method of claim 1 wherein the number of fasteners corresponds with the number of base openings, the number of transparent disk openings and the number of deck surface openings.

3. The method of claim 1 wherein the transparent disk includes a groove extending from a top surface of the disk a distance less than the thickness of the disk and the light source is disposed in the groove.

4. The method of claim 1 wherein the light source is a plurality of discrete LED lamps which are spaced apart.

5. The method of claim 1 wherein the light source is encapsulated to prevent water from contacting the light source.

6. The method of claim 1 wherein the outer circumferential edge extends beyond the stanchion base.

7. The method of claim 6 wherein the outer circumferential edge is chamfered and a portion of the light traveling from the light source to the circumferential edge is directed in the direction perpendicular to the chamfer.

8. A stanchion base for a boat comprising:
a base having a bottom surface, a periphery and at least one base fastener opening corresponding with a boat fastener opening on the boat;
a column extending from the base;
a transparent disk having a thickness, an outer periphery edge corresponding to the base periphery and a disk fastener opening corresponding to the boat fastener opening, the transparent disk disposed adjacent the bottom surface of the base and sufficient to bear the weight of the stanchion base;
at least one fastener extending through the base fastener opening, disk fastener opening and boat fastener opening; and
a light source adjacent the transparent disk;
wherein the light source provides illumination of the periphery edge of the transparent disk, illuminating the area adjacent the stanchion base.

9. The stanchion base of claim 8 wherein the number of fasteners corresponds with the number of base openings, the number of transparent disk openings and the number of deck surface openings.

10. The stanchion base of claim 8 wherein the transparent disk includes a groove extending from a top surface of the disk a distance less than the thickness of the disk and the light source is disposed in the groove.

11. The seat pedestal of claim 8 wherein the light source is a plurality of discrete LED lamps which are spaced apart.

12. The stanchion base of claim 8 wherein the light source is encapsulated to prevent water from contacting the light source.

13. The accessory of claim 8 wherein the outer circumferential edge extends beyond the stanchion base.

14. The stanchion base of claim 13 wherein the outer circumferential edge is chamfered and a portion of the light traveling from the light source to the circumferential edge is directed in the direction perpendicular to the chamfer.

15. A method for providing lighting to a boat surface comprising:
providing a seat pedestal fastenable to the boat surface, the seat pedestal having a base with a periphery and at least one base fastener opening, the base fastener openings corresponding with at least one boat surface opening and at least one fastener disposable through the at least one base fastener opening and the at least one boat surface opening;

providing a transparent disk having a thickness, an outer circumferential edge corresponding to the base periphery and at least one transparent disk opening corresponding to the boat surface openings sufficient to allow a portion of the fastener to pass therethrough, the transparent disk sufficient to bear the weight of the seat pedestal;

providing an LED light source in the transparent disk;

placing the disk on the boat surface in a location where the seat pedestal is to be mounted with the disk fastener openings aligned with the boat surface openings;

connecting a power source to the LED light source;

placing the seat pedestal on the transparent disk with the seat pedestal fastener openings aligned with the disk fastener openings;

inserting the at least one fastener through the seat pedestal openings, disk openings and boat surface openings;

tightening the at least one fastener to secure the seat pedestal and disk to the boat surface wherein the transparent disk bears the weight of the seat pedestal; and upon providing power to the light source, light travels from the light source to the circumferential edge of the transparent disk, illuminating the area adjacent the seat pedestal.

16. A seat pedestal for a boat comprising:
a base having a bottom surface, a periphery and at least one base fastener opening corresponding with a boat fastener opening on the boat;
a column extending from the base;
a transparent disk having a thickness, an outer periphery edge corresponding to the base periphery and a disk fastener opening corresponding to the boat fastener opening, the transparent disk disposed adjacent the bottom surface of the base and sufficient to bear the weight of the seat pedestal;
at least one fastener extending through the base fastener opening, disk fastener opening and boat fastener opening; and
a light source adjacent the transparent disk;
wherein the light source provides illumination of the periphery edge of the transparent disk, illuminating the area adjacent the seat pedestal.

* * * * *